United States Patent
Schmidt

(10) Patent No.: US 10,132,419 B2
(45) Date of Patent: Nov. 20, 2018

(54) VALVE DEVICE WITH A VALVE HOUSING HAVING MULTIPLE RECESSES

(71) Applicant: ZF Friedrichshafen AG, Friedrichshafen (DE)

(72) Inventor: Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 755 days.

(21) Appl. No.: 13/655,705

(22) Filed: Oct. 19, 2012

(65) Prior Publication Data

US 2013/0099147 A1 Apr. 25, 2013

(30) Foreign Application Priority Data

Oct. 21, 2011 (DE) .................. 10 2011 084 932

(51) Int. Cl.
*F16K 11/07* (2006.01)
*F16K 27/04* (2006.01)

(52) U.S. Cl.
CPC ........ *F16K 27/041* (2013.01); *F16K 11/0716* (2013.01); *Y10T 137/8663* (2015.04)

(58) Field of Classification Search
CPC ............... F16K 27/041; F16K 11/0716; F16K 31/0603; F16K 31/0613; F16K 11/044; Y10T 137/8663; Y10T 137/8671; Y10T 137/86622; Y10T 137/87217; Y10T 137/87225; Y10T 137/86775; Y10T 137/86799

(Continued)

(56) References Cited

U.S. PATENT DOCUMENTS 260,985 A * 7/1882 Hughes ................... F15B 13/04
137/625.68
1,636,632 A * 7/1927 Hansen .................... B25D 9/18
137/625.66

(Continued)

FOREIGN PATENT DOCUMENTS

DE 2028128 A1 12/1971
DE 3801561 A1 8/1989

(Continued)

OTHER PUBLICATIONS

Translation of JP56-113865;Switching valve,Dec. 2016, Phoenix Translations.*

(Continued)

*Primary Examiner* — Craig J Price
(74) *Attorney, Agent, or Firm* — Davis & Bujold PLLC; Michael J. Bujold

(57) ABSTRACT

A valve device which comprises a valve housing having a plurality of shifting tongues and a valve slide that can move longitudinally in the valve housing. The valve slide is made with diameter sections which co-operate with the shifting tongues depending on an axial position of the valve slide. At least one of the diameter sections is made with at least one, at least approximately groove-like recess that extends in the circumferential direction of the valve slide. The groove-like recesses are functionally connected to an axial bore extending in the valve slide essentially in the axial direction, by way of at least one radial bore extending at least approximately in the radial direction in the valve slide.

16 Claims, 3 Drawing Sheets

(58) Field of Classification Search
USPC ............ 137/625.66, 625.69, 625.65, 596.17, 137/596.18, 625.35, 625.38
See application file for complete search history.

(56) References Cited

U.S. PATENT DOCUMENTS

| | | | |
|---|---|---|---|
| 2,570,896 A | | 10/1951 | Winchester |
| 2,765,808 A | | 10/1956 | Tydeman |
| 3,015,317 A | * | 1/1962 | Buchanan ........... F15B 13/0438 137/625.62 |
| 3,191,626 A | * | 6/1965 | Leibfritz ............ F15B 13/0431 137/625.48 |
| 3,219,060 A | * | 11/1965 | Pearl ................... F15B 13/0402 137/625.6 |
| 3,253,614 A | * | 5/1966 | McCay, Jr. ............. F15B 13/06 137/625.69 |
| 3,310,068 A | * | 3/1967 | McGuire ............ F15B 13/0402 137/596 |
| 3,706,322 A | * | 12/1972 | Carlson .............. F16K 11/0716 137/625.66 |
| 3,897,719 A | * | 8/1975 | Tipton .................. E21B 19/084 137/625.66 |
| 4,035,105 A | * | 7/1977 | Dantlgraber .......... F04C 14/223 417/220 |
| 4,187,884 A | * | 2/1980 | Loveless ............... F16K 11/065 137/625.66 |
| 4,196,588 A | * | 4/1980 | Johnson .................. F15B 11/17 137/625.66 |
| 4,522,373 A | * | 6/1985 | Shelbourn ........... F16K 11/0704 137/625.68 |
| 4,593,719 A | * | 6/1986 | Leonard .................... F16K 3/36 137/625.63 |
| 4,646,785 A | * | 3/1987 | Ruedle .................. F16K 27/041 137/625.64 |
| 4,655,378 A | * | 4/1987 | DuFour .............. B65H 23/0208 137/625.68 |
| 4,674,956 A | * | 6/1987 | Dantlgraber ............ F04B 49/08 417/220 |
| 8,322,375 B2 * | | 12/2012 | Helbling ............. F15B 13/0433 137/625.62 |
| 8,387,659 B2 * | | 3/2013 | Hunnicutt ........... F15B 13/0402 137/625.35 |
| 2002/0043287 A1 * | | 4/2002 | Beyrak ..................... F16K 3/26 137/625.66 |
| 2004/0069359 A1 * | | 4/2004 | Buttner ................. F15B 11/163 137/625.69 |
| 2009/0020178 A1 * | | 1/2009 | Stallmann ................. F01L 1/34 137/625.6 |
| 2012/0292540 A1 * | | 11/2012 | Bruck ................. F16K 11/0716 251/14 |

FOREIGN PATENT DOCUMENTS

| | | | |
|---|---|---|---|
| DE | 10 2010 028 762 A1 | | 11/2011 |
| JP | 56113865 | * | 9/1981 |
| JP | H09133250 A | | 5/1997 |
| WO | 2011/138102 A1 | | 11/2011 |

OTHER PUBLICATIONS

German Search Report issued in corresponding German Application No. 10 2011 084 932.7 dated Jun. 20, 2016.

* cited by examiner

VALVE DEVICE WITH A VALVE HOUSING HAVING MULTIPLE RECESSES

This application claims priority from German patent application serial no. 10 2011 084 932.7 filed Oct. 21, 2011.

FIELD OF THE INVENTION

The invention concerns a valve device with a valve housing having a plurality of recesses.

BACKGROUND OF THE INVENTION

In valve devices known from practice, which are made with a valve housing having a plurality of recesses and a valve slide arranged to move longitudinally in the valve housing, depending on the geometry of the valve housing and the valve slide a pressure field is formed around the valve slide which is not symmetrical. Among other things the pressure field depends on the geometric shape of the valve slide, for example whether it is conical, straight or designed cylindrically. Furthermore, the pressure field also depends on bevels formed in the area of the valve housing bore. An unsymmetrical pressure field is formed, in particular, when recesses of the valve housing are produced by a casting process since in that case they are not rotationally symmetrical to the required extent. In the area of the valve slide unsymmetrical pressure fields result in radial and axial forces that act upon the valve slide and impair the functionality of the valve device.

To homogenize the pressure fields produced around the circumferential area of the valve slide, in the seal area between the valve slide and the valve housing, so-termed relief grooves are made in the surface of the valve slide, which are recesses that extend in the circumferential direction of the valve slide and are at least approximately groove-like. Although a pressure field is unsymmetrical as before as far as such a relief groove or furrow, in the area of the relief groove itself, the pressure field is constant. The pressure field is re-formed outside the relief groove. For that reason, in the circumferential direction around the slide, the more relief grooves provided in the area of the valve slide, the pressure field is more homogeneous. In turn, a homogeneous pressure field produces a rotationally symmetric force around the slide, which corresponds to a central force. The slide is then in an almost force-balanced operating condition and with low friction forces in the valve housing, it can be moved to the desired extend by small control forces.

Usually, by means of switching valves of hydraulic or pneumatic pressure systems, in each case a working pressure area can be connected alternately to a low-pressure area or a tank, or to a high-pressure area carrying a system pressure. For example a working pressure area is connected by way of a throttle device to a low-pressure area when the pressure in the working pressure area has to be vented toward the low-pressure area with defined pressure gradients. In such pressure systems, leaks between the high-pressure area carrying the system pressure and the working pressure area are disadvantageous when the working area is connected by means of the valve slide to the low-pressure area and the pressure in the working pressure area has to be reduced to the pressure level of the tank, since the leakage and thus also the venting time of a volume-affected consumption depend markedly on temperature and on the system pressure.

In general leaking always takes place in the area of a valve device when for example the gap size between the valve housing and the valve slide is large or the viscosity of the medium carried in the area of the valve device is very low. In such cases the leakage occurring in the area of the valve device is proportional to the pressure difference, to the third power of the gap size between the valve housing and the valve slide, and to the diameter of the valve slide. Furthermore, the leakage is inversely proportional to the viscosity of the medium and to the overlap length in the area between the valve slide and the valve housing.

To vent a working pressure area by way of a throttle device toward a low-pressure area with a defined gradient is necessary, for example, when a hydraulic end-position sensor of a bidirectionally actuated working piston is positioned upstream from the throttle device, since the quality of the sensor signal is influenced by the leaking in the area of the valve device. Such an end-position sensor system is known, for example, from the previously unpublished patent application DE 10 2010 028 762.8 by the present applicant.

SUMMARY OF THE INVENTION

The purpose of the present invention is to provide a simply designed valve device with a valve housing having a plurality of recesses and a valve slide arranged to move longitudinally in the valve housing, which can be operated with small control forces and in which leaking from a high-pressure area in the direction toward a low-pressure area is slight or avoided completely.

In the valve device according to the invention with a valve housing having a plurality of recesses and a valve slide arranged to move longitudinally within the valve housing, which is designed with diameter sections that co-operate with the recesses depending on its axial position, at least one of the diameter sections is made with at least one, at least approximately groove-like recess that extends in the circumferential direction of the valve slide.

According to the invention the groove-like recess is functionally connected by way of at least one radial bore extending at least approximately in the radial direction in the valve slide, with an axial bore extending essentially in the axial direction in the valve slide, by virtue of which a leak starting from a high-pressure zone toward the working pressure zone and thus also toward the low-pressure zone can be avoided in a simply designed manner, if the groove-like recess near the working pressure zone connected to the low-pressure zone is arranged in a diameter section of the valve slide by which the high-pressure zone is separated from the working pressure zone.

In an embodiment of the valve device according to the invention which saves space particularly in the axial direction, a high-pressure recess, that can be connected to a high-pressure zone of a pressure system in order to produce a pressure, is arranged between working pressure recesses, and the high-pressure recess is connected within a first axial position zone of the valve slide with a first working pressure recess and within a second position zone of the valve slide with a second working pressure recess.

A simply designed embodiment of the valve device according to the invention is characterized in that the high-pressure recess can be connected, via a section of the valve slide having a reduced diameter, to the first working pressure recess or to the second working pressure recess.

In a space-saving and inexpensive embodiment of the valve device according to the invention, the first working pressure recess is connected within the second axial position zone of the valve slide, via the reduced-diameter section, to a tank recess which can be coupled to a low-pressure zone of the pressure system.

In an embodiment of the valve device according to the invention that can be actuated with little control and regulation effort, the second working pressure recess is connected within the first axial position zone of the valve slide, via a further section with reduced diameter, to a further tank recess which can be coupled to a low-pressure zone of a pressure system.

An embodiment of the valve device according to the invention that is characterized by very little leakage between a high-pressure zone and at least one working pressure zone and between the working pressure zone and a low-pressure zone, and which can also be operated with low control forces, is characterized in that in each case diameter sections of the valve slide are formed that delimit the reduced-diameter sections in the axial direction, each having at least one, at least approximately groove-like recess that extends in the circumferential direction of the valve slide, which are functionally connected to the axial bore in each case by way of at least one radial bore.

If axial distances between a recess of a delimiting diameter section and one of the working pressure recesses and between the recess of the delimiting diameter section and the high-pressure recess in defined positions of the valve slide within the first position zone and within the second position zone of the valve slide are respectively of substantially the same size, then leaking that starts from the high-pressure zone toward a working pressure zone is avoided or at least reduced to the desired extent over the entire operating range of the valve device according to the invention.

In another advantageous embodiment of the valve device according to the invention, leakage from the working pressure zone toward a low-pressure zone is reduced to a minimum over the entire operating range of the valve device, since the axial distances between a recess of a delimiting diameter section and one of the working pressure recesses and between the recess of the delimiting diameter section and a tank recess associated with the working pressure recess in defined positions of the valve slide within the first position zone or within the second position zone of the valve slide, are essentially the same size.

An undesired pressure build-up in areas of the valve device according to the invention within which the valve slide can be acted upon in the area of a functional surface with a pressure that influences the functional mode of the valve device, is avoided in a further embodiment of the valve device according to the invention, in that the recess arranged within the first position zone of the valve slide between the first working pressure recess and the tank recess separated from it by the valve slide, is provided within the second position zone of the valve slide, in which the tank recess is connected to the first working pressure recess, between the tank recess and a further recess.

In a further, space-saving embodiment of, the valve device according to the invention, the recess arranged within the first position zone of the valve slide between the second working pressure recess and the high-pressure recess separated from it by the valve slide, is provided within the second position zone of the valve slide, in which the high-pressure recess is connected to the second working pressure recess, between the high-pressure recess and the first working pressure recess.

If a recess of the valve slide arranged within the second position zone of the valve slide between the second working pressure recess and the associated tank recess is provided, within the first position zone of the valve slide, between the tank recess associated with the second working pressure recess and a further recess, in the area of which the valve slide can be acted upon by a pressure in the area of a functional surface, this reliably avoids a pressure build-up in the area of the further recess that could impair the functional mode of the valve device according to the invention.

In a further advantageous and space-saving embodiment of the valve device according to the invention, the second working pressure recess is connected within the first position zone of the valve slide by way of the reduced-diameter section to a further tank recess, which can be coupled to a low-pressure zone of a pressure system.

If diameter sections of the valve slide that delimit reduced-diameter sections in the axial direction are formed in each case with at least one, at least approximately groove-like recess that extends in the circumferential direction of the valve slide, which are functionally connected to an axial bore in each case via at least one radial bore, then leaking from a high-pressure zone toward a working pressure zone and from a working pressure zone toward a tank pressure zone is reduced to a minimum with little design and construction complexity and in addition a homogeneous pressure field is formed in the circumferential direction around the valve slide, which enables the valve device to be operated with low control forces.

If an axial distance between the recesses of the delimiting diameter sections and, respectively, one of the working pressure recesses in defined positions of the valve slide within the first position zone and within the second position zone of the valve slide, is smaller than the distance between the recesses of the delimiting diameter sections and the high-pressure recesses, the valve device according to the invention can be made to occupy little axial space while at the same time having a good sealing action.

In another space-saving embodiment of the valve device according to the invention, an axial distance between a recess of a delimiting diameter section and a working pressure recess, in defined positions of the valve slide within the first position zone or within the second position zone of the valve slide, is larger than a distance between the recess of the delimiting diameter section and a tank recess associated with the working pressure recess.

Both the characteristics indicated in the claims and those indicated in the following example embodiments of the valve device according to the invention are in each case, whether taken in isolation or in any combination with one another, suitable as further developments of the object of the invention. In relation to such further development of the object of the invention, the respective combinations of characteristics have no restrictive force, but are presented essentially only as examples.

Further advantages and advantageous embodiments of the valve device according to the invention emerge from the example embodiments whose principle is described below and with reference to the drawing. For the sake of clarity, in the description of the various example embodiments the same indexes are used for components having the same structure and function.

DETAILED DESCRIPTION OF THE PREFERRED EMBODIMENTS

Figure 1:
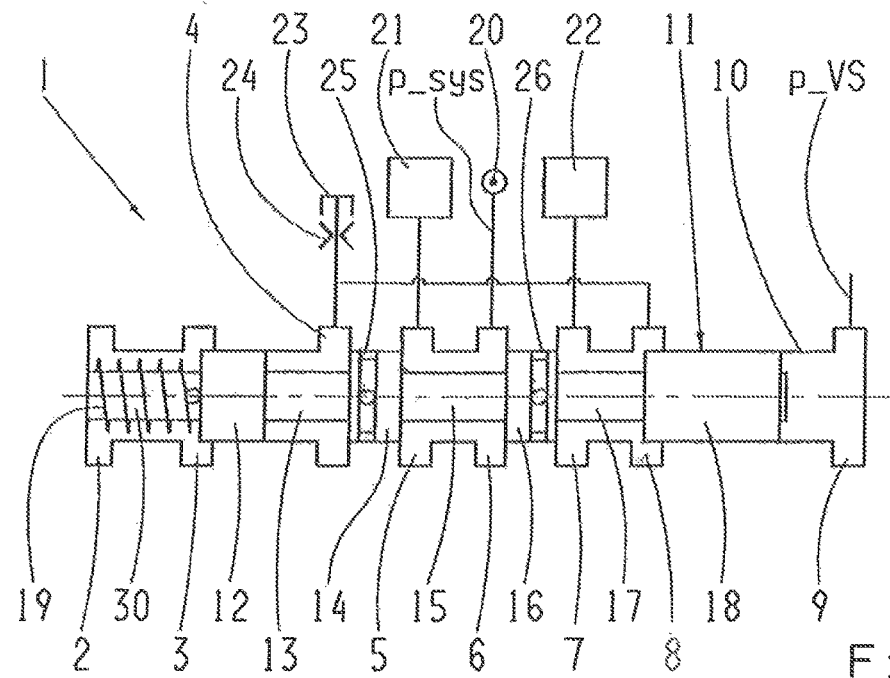
FIG. 1: A schematic longitudinally sectioned view of a first example embodiment of the valve device according to the invention, in a first switching position.

FIG. 1 shows a longitudinally sectioned view of a first example embodiment of a valve device 1 with a valve housing 10 having a plurality of recesses 2 to 9 and a valve slide 11 arranged to move longitudinally in the valve housing 10. The valve slide 11 is designed with diameter sections 12 to 18 that co-operate, respectively, with the recesses 2 to 9 depending on the axial position of the valve slide within the valve housing 10, and with a further diameter section 30, such that the diameter sections 12 and 14 delimit a section 13 with reduced diameter, the diameter sections 14 and 16 delimit a reduced-diameter section 15, and the diameter sections 16 and 18 delimit a reduced-diameter section 17 in the axial direction.

Figure 2:
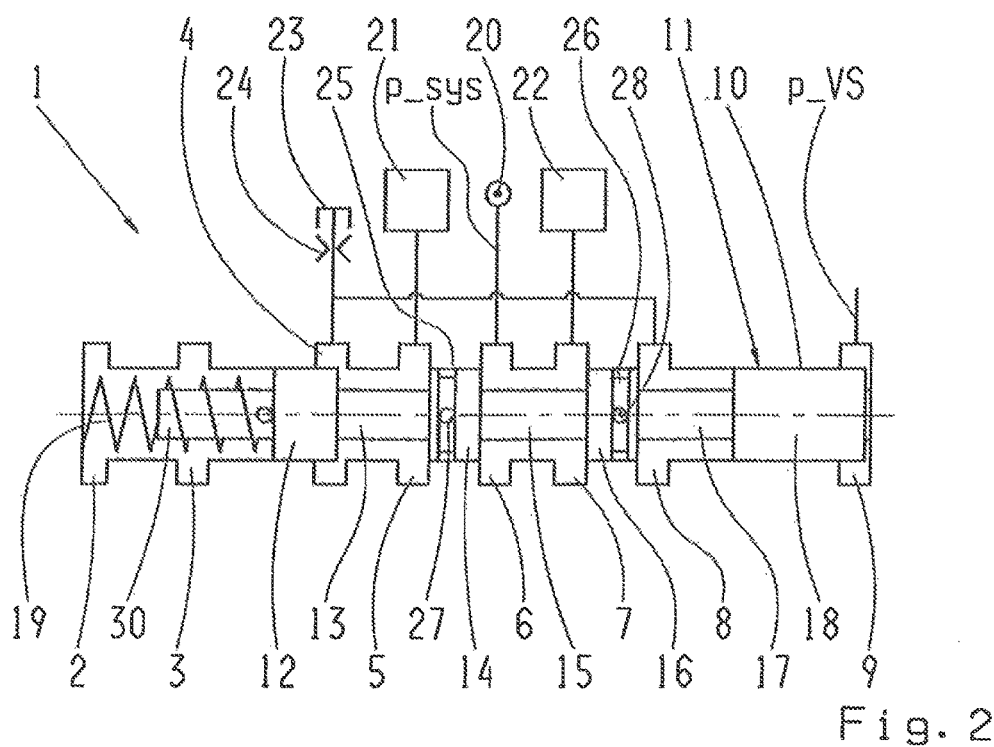
FIG. 2: The valve device of FIG. 1 in a second switching position.

In its end position associated with the recess 2, the valve slide 11 is acted upon by the spring force of a spring device 19, which acts in opposition to a pressure force component resulting from a control pressure p_VS which can be applied in the area of the recess 9, and which is supported against a step on the valve slide 11 in the transition zone between the diameter section 30 and the delimiting diameter section 12. In FIG. 1 the valve slide 11 is pushed over by the applied control pressure p_VS, in opposition to the spring force of the spring device 19, to its second end position, FIG. 2 shows the valve slide 11 in its first end position, which the valve slide 11 adopts below a defined pressure level of the control pressure p_VS by virtue of the applied spring force of the spring device 19.

The recess 6 of the valve device 1 is connected to a high-pressure zone 20 that contains a system pressure p_sys, and in what follows will be called the high-pressure recess. The two recesses 5 and 7 respectively adjacent to the high-pressure recess 6 are each connected to a respective working pressure zone 21 or 22 and in what follows will be called working pressure recesses. Respectively on the sides of the working pressure recess 5 or 7 facing away from the high-pressure recess 6 are provided the recesses 4 or 8, each functionally connected, via a throttle device 24. to a low-pressure zone 23, and to distinguish them more effectively they will be called tank recesses in what follows. In the present case the low-pressure zone is an oil sump of a transmission of a vehicle, whose pressure level corresponds essentially to the pressure of the surroundings.

In the valve device 1 there is a respective working pressure recess 5 or 7 between the pressure supply pocket or high-pressure recess 6 and a tank pocket or tank recess 4 or 8. By way of the valve device 1 designed as a 4/2-way valve the working pressure zones 21 and 22 can be pressurized either with the system pressure p_sys or with the tank pressure of the low-pressure zone 23. For this, the valve slide 11 has to be displaced between the switching positions shown in FIGS. 1 and 2, so that the reduced-diameter section 15 of the valve slide 11 connects the high-pressure recess 6 either to the working pressure zone 21 or to the working pressure zone 22.

In the switching position of the valve slide 11 shown in FIG. 1, the high-pressure recess 6 is connected, via the reduced-diameter section 15, to the working pressure recess 5, while the working pressure recess 7 is separated from the high-pressure recess 6 by the delimiting diameter section 16 of the valve slide 11. At the same time the working pressure recess 5 is separated by the delimiting diameter section 14 of the valve slide 11 from the tank recess 4, while the working pressure recess 7 is functionally connected, via the reduced-diameter section 17, to the tank recess 8. This means that by virtue of the control pressure p_VS applied on the valve slide 11, the pressure of the working pressure zone 21 corresponds essentially to the pressure level of the system pressure p_sys, while as the operating time increases, the pressure in the working pressure zone 22 decreases via the throttle device 24 in a defined manner, i.e. with a defined pressure gradient, in the direction toward the low-pressure zone 23, down toward the pressure level of the low-pressure zone 23.

Figure 3:
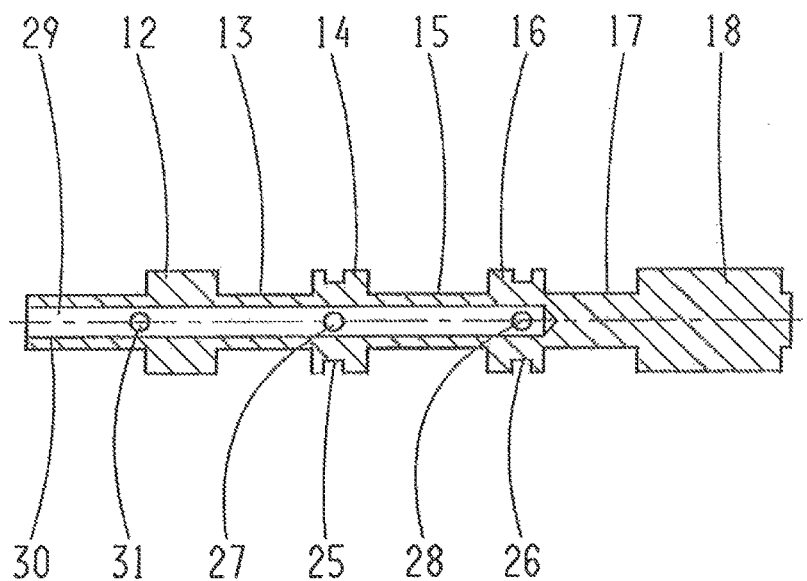
FIG. 3: A detailed longitudinally sectioned view of a valve slide of the valve device shown in FIG. 1.

To avoid leakage from the high-pressure zone 20 toward the low-pressure zone 23, the delimiting diameter sections 14 and 16 of the valve slide 11 are in each case made with an at least approximately groove-like recess 25, 26 extending in the circumferential direction of the valve slide 11, each of which is functionally connected by a radial bore 27, 28 extending in the radial direction in the valve slide 11 to an axial bore 29 extending in the axial direction in the valve slide 11, as shown in more detail in FIG. 3. In addition, in the area of the further diameter section 30 in whose area the spring device 19 is provided, the valve slide 11 is made with a further radial bore 31 by which the axial bore 29 is connected to the recesses 2 and 3, which are directly functionally connected to the low-pressure zone 23, whereby the axial bore 29 is vented, unthrottled, toward the low-pressure zone 23.

In this case an axial distance between the recesses 25 and 26 of the diameter sections 14 and 16 that delimit the reduced-diameter section 15 in the axial direction and, respectively, one of the working pressure recesses 5 or 7 in the first or in the second switching position of the valve slide 11, is smaller than a distance between the recesses 25 and 26 of the diameter sections 14 or 16 and the high-pressure recess 6. Furthermore, an axial distance between the recesses 25, 26 of the delimiting diameter sections 14, 16 and the working pressure recesses 5 or 7 in the first or second switching position of the valve slide 11, is larger than an axial distance between the recesses 25, 26 of the delimiting diameter sections 14, 16 and the respective tank recesses 4, 8 associated with the working pressure recesses 5, 7.

In a simply designed manner, which is also space-saving in the axial direction, the off-center arrangement of the recesses or relief grooves 25 and 26 in the area of the delimiting diameter section 14 and 16 offers the possibility that between the valve slide 11 and the valve housing 10, with the applied system pressure p_sys there will be a large overlap and thus a greater sealing action over the full operating range of the valve device 1, than with the pressure level produced during venting of the working pressure zone 21 or of the working pressure zone 22.

In the valve device 1 shown in FIGS. 1 and 2, the same pressure difference always exists between the recesses 25 and 26. Owing to the large overlap length created due to the asymmetric arrangement of the recesses 25 and 26 in the diameter sections 14 and 16, between the high pressure, i.e. the system pressure p_sys or the working pressure of the working pressure zone 21 or the working pressure zone 22 and the respective low pressure in the area of the tank recesses 4 and 8, the leakage from the high-pressure zone 20 toward the low-pressure zone 23 is kept as small as possible.

Since, in the area of the valve device 1 between the location of the tank recess 4 or the tank recess 8 respectively and the recesses 25 and 26 the respective pressure differences are smaller, to achieve the desired sealing effect in the area between the valve slide 11 and the valve housing 10 in each case only a small overlap length is needed and must be provided; consequently, by virtue of the asymmetric arrangement of the recesses 25 and 26 the axial space occupied by the valve device 1 is minimized in a simply designed manner, whereas direct leaking from the high-pressure p_sys present in the high-pressure zone 20 toward the throttle device 24 is avoided or reduced to the extent desired.

Figure 4:
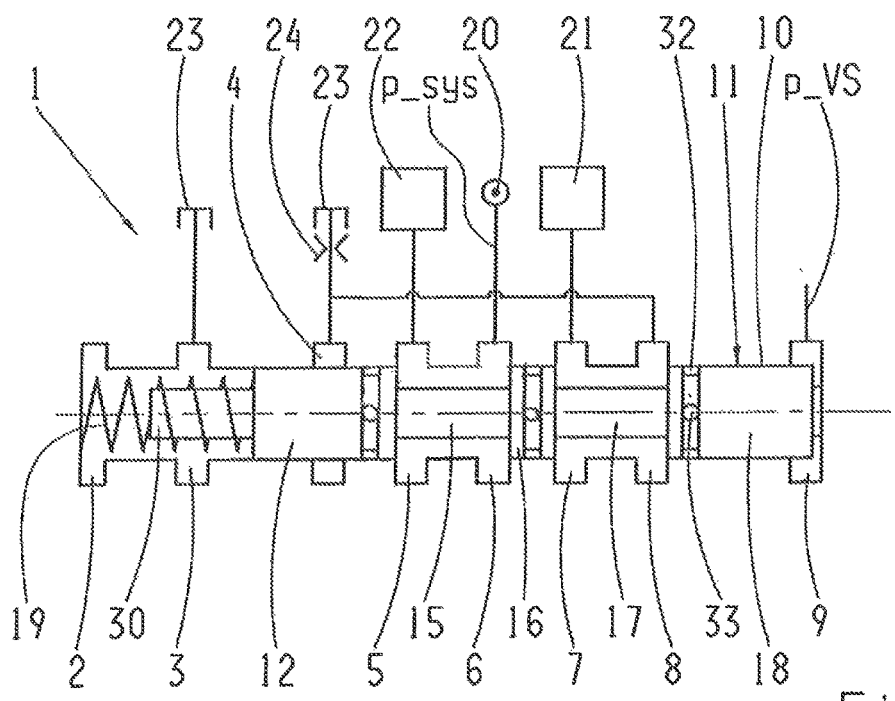
FIG. 4: A representation corresponding to that of FIG. 1, showing a second example embodiment of the valve device according to the invention, in a first switching position.
Figure 5:
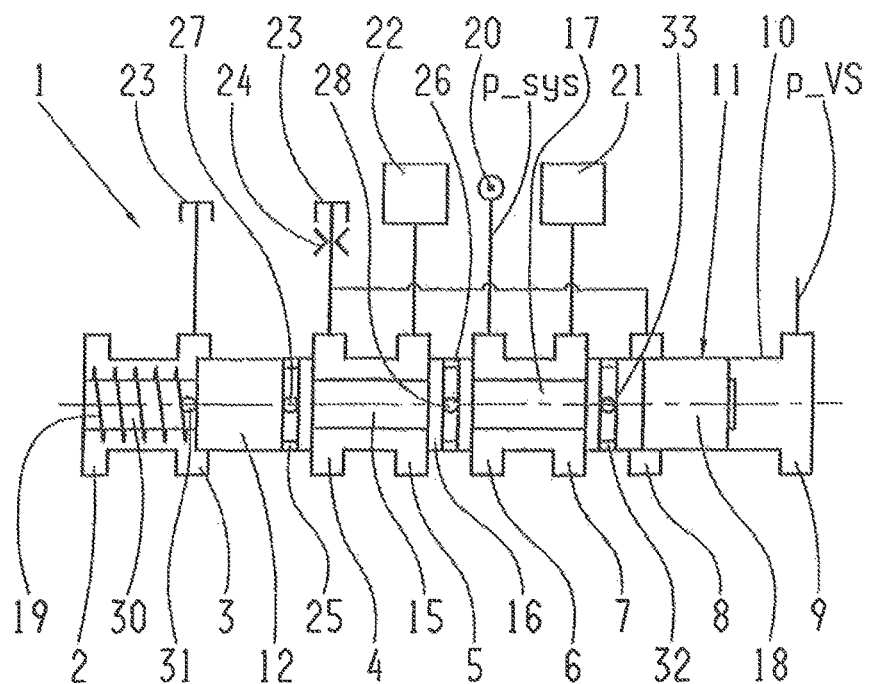
FIG. 5: The valve device of FIG. 4 in a second switching position.

FIGS. 4 and 5 show a second example embodiment of the valve device 1, which differs from the example embodiment according to FIGS. 1 to 3 essentially only in that the design of the valve slide 11 is partly different, and for this reason the description given below will deal only with the differences between the two example embodiments of the valve device 1 while in relation to the further functions of the valve device 1 shown in FIGS. 4 and 5 reference should be made to the description of FIGS. 1 to 3.

The valve slide 11 of the valve device 1 in FIGS. 4 and 5 is made without the two diameter sections 13 and 14 by means of which, in the valve device 1 according to FIGS. 1 to 3, the tank recess 4 can be connected to or separated from the working pressure recess 5. In the version of the valve device 1 in FIGS. 4 and 5, in the switching position of the valve slide 11 shown in FIG. 4 the tank recess 4 is separated by the delimiting diameter section 12 from the working pressure recess 5, whereas in the switching position of valve slide 11 shown in FIG. 5 the working pressure recess 5 is functionally connected to the tank recess 4 by the reduced-diameter section 15. The working pressure zone 21 is connected to the working pressure recess 7, while the working pressure zone 22 is coupled to the working pressure recess 4.

Since the recess 26 of the diameter section 16 is between the high-pressure recess 6 and the working pressure recess 7 in the first switching position of the valve slide 11 and between the high-pressure recess 6 and the working pressure recess 5 in the second switching position of the valve slide 11, the recess 26 is arranged centrally in the delimiting diameter section 16 so that respectively, an axial distance between the recess 26 and the high-pressure recess 6 and a distance between the recess 26 and the working pressure recesses 5 or 7 respectively are the same size. This is necessary, since the large pressure difference between the high system pressure and the low pressure zone of the recess 26 changes direction depending on the switching position.

In addition, to avoid any direct leakage starting from the working pressure pocket 7 toward the tank pressure pocket 8, the diameter section 18 of the valve slide 11 of the valve device according to FIGS. 4 and 5 is formed with a recess 32 corresponding to the recesses 25, 26, which is also connected to the axial bore 29 by way of a radial bore 33. In this case the recess 32 is positioned in the axial direction in the diameter section 18 in such manner that a distance between the recess 32 and the working pressure recess 7 and a distance between the recess 32 and the tank recess 8 are equal, as shown in FIG. 5.

While having the same overall axial length as the valve device according to FIGS. 1 to 3, the version of the valve device 1 shown in FIGS. 4 and 5 has a smaller overlap length and hence a lesser sealing effect between the valve slide 11 and the valve housing 10 in the area of the delimiting diameter section 16. In order not to reduce the sealing effect compared to the valve device 1 between the high-pressure recess 6 and the two working pressure recesses 4 and 6, in this area the overlap length between the valve slide 11 and the valve housing 10 should be increased by making the axial length of the valve slide 11 and the valve housing 10 longer compared with the version of the valve device 1 according to FIGS. 1 to 3, although this leads to a longer slide path of the valve slide 11 in the valve housing 10, with an adverse effect on the reaction time of the valve device 1.

INDEXES

1 Valve device
2 to 9 Recesses
10 Valve housing
11 Valve slide
12 to 18 Diameter sections of the valve slide
19 Spring device
20 High-pressure zone
21, 22 Working pressure zones
23 Low-pressure zone
24 Throttle device
25, 26 Recesses
27, 28 Radial bores
29 Axial bore
30 Diameter section
31 Further radial bore
32 Recess
33 Radial bore
p_sys System pressure
p_VS Control pressure

The invention claimed is:

1. A valve device comprising a valve housing having a plurality of housing recesses and a valve slide being arranged to move longitudinally within the valve housing between first and second axial end positions, the valve slide being made with delimiting diameter sections and reduced-diameter sections, the reduced-diameter sections having smaller diameters than the delimiting diameter sections, the delimiting diameter sections and the reduced-diameter sections co-operate with the plurality of housing recesses depending on an axial position of the valve slide, a first of the delimiting diameter sections being formed with a first annular grooved recess and the first delimiting diameter section has an inner surface and an outer surface, the inner and the outer surfaces of the first delimiting diameter section delimit an entire axial length of the first delimiting diameter section, the first annular grooved recess is axially located along the axial length of the first delimiting diameter section so as to be closer to the outer surface of the first delimiting diameter section than the inner surface of the first delimiting diameter section, a second of the delimiting diameter sections being formed with a second annular grooved recess and the second delimiting diameter section has an inner surface and an outer surface, the inner and the outer surfaces of the second delimiting diameter section delimit an entire axial length of the second delimiting diameter section, the second annular grooved recess is axially located along the axial length of the second delimiting diameter section so as to be closer to the outer surface of the second delimiting diameter section than the inner surface of the second delimiting diameter section, the inner surfaces of the first and the second delimiting diameter sections axially face toward each other and a high-pressure recess that is axially located therebetween, and the first and the second annular grooved recesses extending in a circumferential direction completely around the valve slide, and the first annular grooved recess being functionally connected, by a first radial bore extending at least approximately in a radial direction in the valve slide, to a common axial bore extending in an axial direction within the valve slide, the second annular grooved recess being functionally connected, by a second radial bore extending at least approximately in a radial direction in the valve slide, to the common axial bore so that both the first and the second radial bores being in fluid communication with the common axial bore, when the valve slide is in either one of the first and the second axial end positions, the first annular grooved recess and the first radial bore are aligned with the first delimiting diameter section, and the plurality of housing recesses in the valve housing comprise first and second working pressure recesses, first and second tank recesses and a high-pressure recess, the plurality of housing recesses are aligned in an axial direction, and the first working pressure recess and the first tank recess being located on a first side of the high-pressure recess while the second working pressure recess and the second tank recess being located on a second opposite side of the high-pressure recess, the high-pressure recess is connectable to a high-pressure zone of a pressure system to produce a pressure, the high-pressure recess is axially arranged between the first working pressure recess and the second working pressure recess, and the high-pressure recess is connected to the first working pressure recess, in the first axial end position of the valve slide, and to the second working pressure recess, in the second axial end position of the valve slide, and the inner surfaces of the first and the second delimiting diameter sections axially delimit an intermediate reduced-diameter section of the valve slide, in the first axial end position of the valve slide, the second working pressure recess is connected by a first one of the reduced-diameter sections to the second tank recess, which is couplable to a low-pressure zone of the pressure system, in the first axial end position of the valve slide, the first annular grooved recess is arranged between the first working pressure recess and the first tank recess and the valve slide separates the first working pressure recess from the first tank recess, and in the second axial end position of the valve slide, the first annular grooved recess is arranged between the first tank recess and a further tank recess and the first tank recess is connected to the first working pressure recess.

2. The valve device according to claim 1, wherein the high-pressure recess is connectable, by the intermediate reduced-diameter section of the valve slide, to either the first working pressure recess or the second working pressure recess.

3. The valve device according to claim 2, wherein in the second axial end position of the valve slide, the first working pressure recess is connected by the one of the reduced-diameter sections to the first tank recess, which is couplable to a low-pressure zone of the pressure system.

4. The valve device according to claim 2, wherein a third delimiting diameter section of the valve slide, that delimit a respective reduced-diameter section, has a third annular grooved recess which extends in the circumferential direction of the valve slide, and the third annular grooved recess is functionally connected to the common axial bore by a third radial bore.

5. The valve device according to claim 2, wherein
in the second axial end position of the valve slide, the first working pressure recess is connected by the intermediate reduced-diameter section to the first tank recess, which is couplable, via a throttle device, to a low-pressure zone of the pressure system, and
in the first axial end position of the valve slide, the second working pressure recess is connected by a first one of the reduced-diameter sections to the second tank recess which is couplable, via the throttle device, to a low-pressure zone of the pressure system.

6. The valve device according to claim 1, wherein in defined positions of the valve slide, within the first axial end position of the valve slide, an axial distance between the first annular grooved recess of the first delimiting diameter section and the first working pressure recess is substantially the same as an axial distance between the second annular grooved recess of the second delimiting diameter section and the high-pressure recess and, within the second axial end position of the valve slide, an axial distance between the second annular grooved recess of the second delimiting diameter section and the second working pressure recess is substantially the same as an axial distance between the first annular grooved recess of the first delimiting diameter section and the high-pressure recess.

7. The valve device according to claim 1, wherein in defined positions of the valve slide, within the first axial end position of the valve slide, an axial distance between the first annular grooved recess of the first delimiting diameter section and one of the first and the second working pressure recesses is the substantially same as an axial distance between the second annular grooved recess of the second delimiting diameter section and one of the first and the second tank recesses closest to the other one of the first and the second working pressure recesses.

8. The valve device according to claim 1, wherein the first annular grooved recess of the valve slide which, within the second axial end position of the valve slide is arranged between the second working pressure recess and the second tank recess, is located in the first axial end position of the valve slide between the second tank recess associated with the second working pressure recess and a further recess, in an area of which the valve slide is acted upon in an area of a functional surface by a pressure.

9. The valve device according to claim 1, wherein within the first axial end position of the valve slide, the second working pressure recess is connected by one of the reduced-diameter sections to the second tank recess, which is couplable to a low-pressure zone of a pressure system.

10. The valve device according to claim 1, wherein a third delimiting diameter section of the valve slide, that delimits one of the reduced-diameter sections in the axial direction, is formed with a third annular grooved recess, which extends in the circumferential direction of the valve slide, and the third annular grooved recess is functionally connected to the common axial bore by a third radial bore.

11. The valve device according to claim 10, wherein in defined axial positions of the valve slide, within the first axial end position and within the second axial end position of the valve slide, an axial distance between the annular grooved recesses of the delimiting diameter sections and, respectively, one of the working pressure recesses is smaller than a distance between the annular grooved recesses of the delimiting diameter sections and the high-pressure recess.

12. The valve device according to claim 1, wherein within the first axial end position of the valve slide, an axial distance from the first annular grooved recess of the first delimiting diameter section to the first working pressure recess is larger than a distance from the first annular grooved recess of the first delimiting diameter section to the first tank recess respectively associated with the first working pressure recess, and within the second axial end position of the valve slide, an axial distance from the second annular grooved recess of the second delimiting diameter section to the second working pressure recess is larger than a distance from the second annular grooved recess of the second delimiting diameter section to the second tank recess respectively associated with the second working pressure recess.

13. The valve device according to claim 1, further comprising a further tank recess which forms an unthrottled connection from the first and the second radial bores to a low-pressure zone of the pressure system.

14. The valve device according to claim 13 wherein
 a further radial bore connects the common axial bore to the further tank recess, and
 the further tank recess is axially spaced from the high-pressure recess by the first tank recess and the first working pressure recess.

15. A valve device comprising a valve housing having a plurality of recesses and a valve slide being arranged to move longitudinally within the valve housing between first and second axial end positions, the valve slide being made with delimiting diameter sections and reduced-diameter sections, the reduced-diameter sections having smaller diameters than the delimiting diameter sections, the delimiting diameter sections and the reduced-diameter sections co-operate with the plurality of recesses depending on an axial position of the valve slide,
 at least one of the delimiting diameter sections being formed with an annular grooved recess extending in a circumferential direction about the valve slide, and
 the annular grooved recess being functionally connected, by way of at least one radial bore extending at least approximately in a radial direction in the valve slide, to a common axial bore extending in an axial direction within the valve slide,
 when the valve slide is in either one of the first and the second axial end positions, the annular grooved recess and the at least one radial bore are aligned with one of the delimiting diameter sections,
 the plurality of recesses in the valve housing comprise a first working pressure recess, a second working pressure recess and a high-pressure recess, the high-pressure recess is connectable to a high-pressure zone of a pressure system to produce a pressure, the high-pressure recess is axially arranged between the first and the second working pressure recesses, and the high-pressure recess is connected to the first working pressure recess, in the first axial end position of the valve slide, and to the second working pressure recess, in the second axial end position of the valve slide,
 in the first axial end position of the valve slide, the annular grooved recess is arranged between the second working pressure recess and the high-pressure recess, and the valve slide separates the second working pressure recess from the high-pressure recess, and
 in the second axial end position of the valve slide, the annular grooved recess is arranged between the high-pressure recess and the first working pressure recess and the high-pressure recess is connected to the second working pressure recess.

16. A valve device comprising:
 a valve housing defining an axis and having an inner diameter, the valve housing having a plurality of housing recesses arranged along the axis of the valve housing, and the plurality of housing recesses having diameters that are larger than the inner diameter of the valve housing;
 a valve slide being axially slidable within the valve housing, the valve slide comprising at least first and second primary axial sections having an outer diameter that corresponds to the inner diameter of the valve housing such that the first and the second primary axial sections of the valve slide slidably mate with the inner diameter of the valve housing, the valve slide further comprising secondary axial sections having a diameter that is smaller than the outer diameter of the first and the second primary axial sections of the valve slide, the first and the second primary axial sections and the secondary axial sections of the valve slide being axially sequentially arranged such that each of the first and the second primary axial sections of the valve slide is arranged between a respective pair of the secondary axial sections of the valve slide and each of the first and the second primary axial sections of the valve slide comprising an annular groove extending completely around the valve slide within the outer diameter of the first and the second primary axial sections, and each of the first and the second primary axial sections of the valve slide comprising a radially extending bore that unites an axially extending central bore of the valve slide with the respective annular groove within the outer diameter of the first and the second primary axial sections of the valve slide;
 adjacent housing recesses of the plurality of housing recesses of the valve housing are either open to each other or closed to each other, depending on an axial position of the valve slide within the valve housing; and
 the valve slide is axially slidable between first and second axial end positions, and in both of the first and the second axial end positions of the valve slide, the first and the second primary axial sections are each axially aligned between a respective pair of axially adjacent housing recesses of the plurality of housing recesses such that the annular grooves of the first and the second primary axial sections are fully radially enclosed by the inner diameter of the valve housing.

* * * * *